United States Patent [19]

Kollar

[11] Patent Number: 4,608,889
[45] Date of Patent: Sep. 2, 1986

[54] LATHE FOR CUTTING WOODEN SPINDLES

[76] Inventor: James Kollar, 622 Elizabeth St., Bridgeville, Pa. 15017

[21] Appl. No.: 749,677

[22] Filed: Jun. 28, 1985

[51] Int. Cl.$^4$ .............................................. B23B 3/28
[52] U.S. Cl. ...................................... 82/14 R; 142/7
[58] Field of Search ........................... 142/7, 1, 55, 47; 82/14 R

[56] References Cited

U.S. PATENT DOCUMENTS 3,405,745  10/1968  Schoonover et al. .................. 142/1

FOREIGN PATENT DOCUMENTS 709587  8/1941  Fed. Rep. of Germany .......... 142/7
009460  2/1979  Netherlands .............................. 142/7

*Primary Examiner*—Leonidas Vlachos
*Attorney, Agent, or Firm*—William J. Ruano

[57] ABSTRACT

A lathe for cutting wooden spindles comprising a rectangular pattern board on which is mounted a pattern spindle and which contains end slots for adjustably positioning the pattern board closer to the work spindle when it is desired to have a product relatively smaller than that of the pattern. Parallel to the pattern and work spindles, is a cutting unit support in the form of a track, also parallel to the spindles, on which is slidably mounted, a tool carrier housing which rigidly supports a tool carrier in the form of a carriage. The carriage is propelled in either direction on a screw-threaded rod parallel to the cutting unit support. At one end of the threaded rod, a handle is provided which drives a train of gears so as to turn the threaded rod at high speed in either direction. The other end of the threaded rod is provided with a handle for directly rotating the threaded rod at low speed. A reciprocable support contained in the tool carrier has, at one end, a pattern follower and, at the other end, a tool for cutting the rotating work. The parts are of standard construction readily available in hardware stores and are very few as compared to prior lathes, making the lathe very inexpensive and affordable by the average home dweller.

3 Claims, 7 Drawing Figures

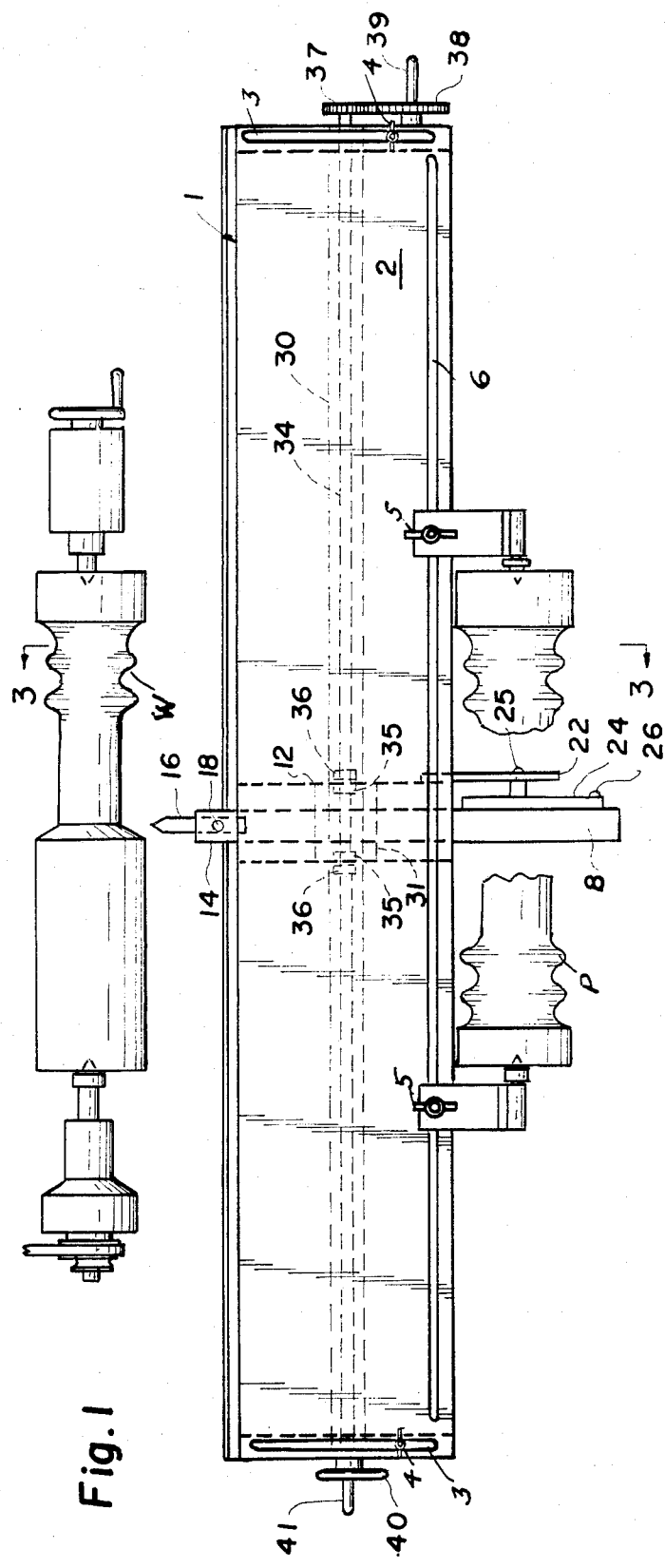
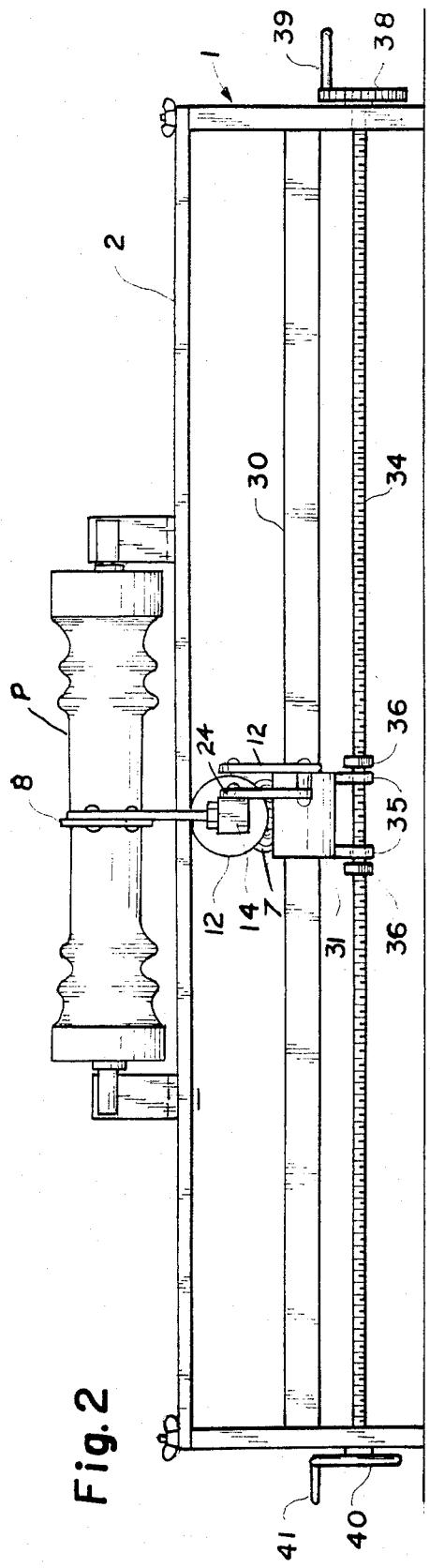

LATHE FOR CUTTING WOODEN SPINDLES

This invention relates to a lathe which is particularly suitable for cutting wooden spindles.

In the past, such lathes have been provided which involved numerous parts of relatively complicated and expensive construction to manufacture and did not provide vernier control very often required when cutting a rotating wooden spindle.

An object of this invention is to overcome the above-named disadvantages and to provide a wood spindle cutting lathe involving relatively few standard parts of such low cost that the average person interested in wood cutting could afford the use of a lathe in his own home.

Other objects and advantages of the invention will become more apparent from a study of the following description taken with the accompany drawings wherein:

FIG. 1 is a top view and FIG. 2 is an elevation view of a wooden spindle cutting lathe embodying the invention;

Figure 7:
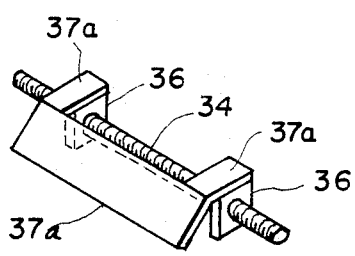

FIG. 7 is a perspective view of a fragmentary portion of the screw threaded rod 34 and nuts 36 showing a unique cover 37a which can be added to the structure shown in FIG. 2 to prevent relative rotation of nuts 36.

DETAILED DESCRIPTION OF THE DRAWINGS

Referring more particularly to FIGS. 1 and 2 of the drawings, numeral 1 generally denotes a lathe for cutting a wooden spindle or work W. On top of the lathe, there is provided a lid or pattern board 2 of rectangular construction having slots 3,3 at its ends, together with wing nuts 4 to enable the pattern board to be adjustably moved and held either closer to or farther from the work spindle W which is mounted in the usual manner, that is, having a belt drive to effect rotation thereof while being cut by a cutting tool 16. A pattern sprindle P is mounted by two wing nuts 5,5 on the pattern board 2 and may be adjustable secured at any desired longitudinal position of slot 6.

Figure 3:
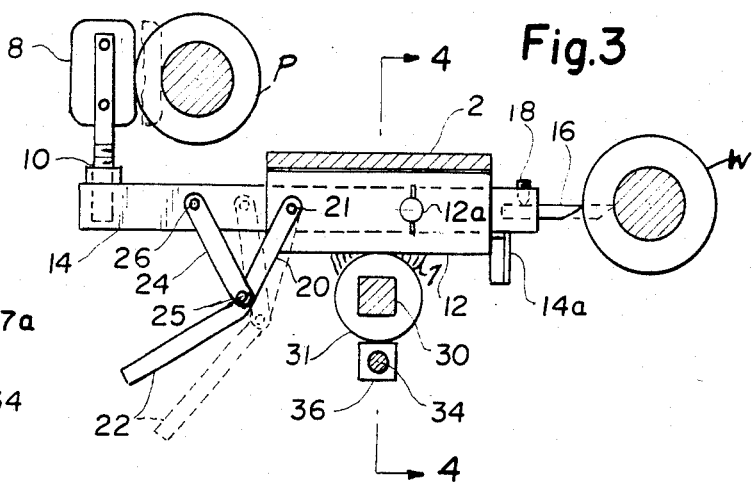
FIG. 3 is a cross-sectional view taken along line 3—3 of FIG. 1.
Figure 5:
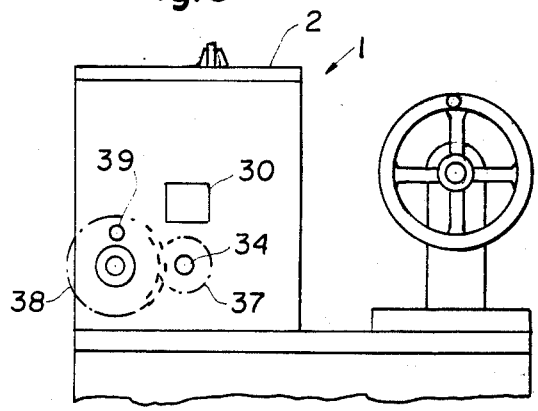
FIG. 5 is an end view taken at the right of FIGS. 1 and 2.
Figure 6:
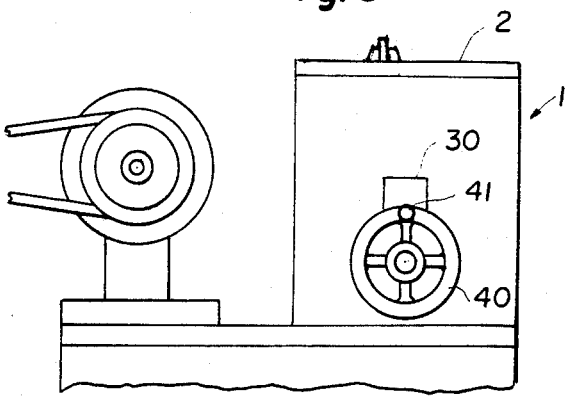
FIG. 6 is an end view taken from the left of FIGS. 1 and 2.

As shown more clearly in FIG. 3, a pattern follower 8, in the form of a blade, is adapted to engage the pattern spindle P while moving longitudinally thereof to guide the cutting movements of tool 16 as it engages the rotating work spindle W. The pattern follower 8 is adjustable secured by nut 10 engaging a screw threaded shank threadedly mounted on a reciprocable support 14 for cutting tool 16. The tool is adjustably mounted on support 14 by means of a screw threaded locking member 18.

Support 14 is slidable in either direction in the tool carrier 12 by means of a lever comprising a handle 22 and an integral angularly disposed portion 20 thereof which is pivotally connected to the carrier 12, as more clearly shown in FIGS. 3 and 2. A link 24 is directly and pivotally connected to the support 18. Therefore, when handle 22 is moved downwardly, the lever will assume the position shown in dotted outline so as to retract the support 14 from the carrier 12. When moved upwardly, of course, it will move the support 14 and cutting tool 16 towards the work W. Nut 12a locks carrier 12 to support 14. By virtue of the linkage described, as the pattern board 2 is adjustably moved towards the work W, carrying the pattern P with it, it will cause the work to be cut at a relatively smaller size as compared to the pattern P than when it moves away from the work. Welded at 7, to the bottom of the carrier 12, is a tool carrier housing 31 which is slidably moveable on a track 30 of square cross section on which the housing 31 slides as a carriage.

The housing or carriage 31 is slidable along track 30 by means of a screw threaded rod 34, parallel to said track, which is rotated in either direction by a high speed handle 39 on gear 38 which drives a pinion 37 directly connected to the end of the threaded rod 34 to rotate to about a 6 to 1 ratio. At the left of the threaded shaft 34, a wheel 40 is directly connected thereto and driven by a low speed handle 41. Thus the operator can selectively rotate the threaded shaft 34 either by high speed handle 39 or, when vernier adjustment of rotation is desired, by the low speed handle 41.

Figure 4:
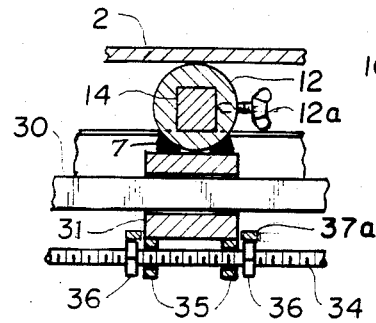
FIG. 4 is a cross-sectional view taken along line 4—4 of FIG. 3.

Depending portions 35 from the housing or carriage 31, have holes therethrough which encircle but are not threaded to the screw threaded rod 34, as better shown in FIG. 4. However, nuts 36,36 are provided which are preferably covered and interconnected by element 37a, shown in FIG. 7, which has the purpose of locking nuts 36,36 against relative rotation and thereby having them move in unison along threaded rod 34. The element 37a has been omitted from FIG. 2 for the purposes of clarity and easier understanding of the assembly, but is intended to form a component part of the assembly shown in FIG. 2.

Thus it will be seen that I have provided a novel assembly of simple and inexpensive parts that can be readily purchased in any hardward store and which enables assembly of a low cost wood cutting lathe which the ordinary home owner can afford to purchase and do his own wooden spindle cutting.

While the lathe has been described as useful for cutting a wooden spindle, it could be used for cutting soft metals.

While I have illustrated and described a single specific ebodiment of my invention, it will be understood that this is by way of illustration only and that various changes and modifications may be contemplated in my invention within the scope of the following claims.

I claim:

1. A lathe for cutting rotating spindles of soft material, such as wood and soft metals, comprising a frame, a flat rectangular lid mounted on said frame and serving as a pattern board supporting a pattern spindle, said pattern board having end slots for adjustably moving the pattern board in its plane towards or away from a rotating work spindle, means for adjustably mounting said pattern spindle on said pattern board, a tool carrying support at right angles to said pattern spindle, lever means for selectively moving said tool carrying support towards or away from said work sprindle, a pattern follower mounted on said support for following the contour of said pattern sprindle under the action of said lever means, and carriage means mounted on said frame for moving said tool cutting support longitudinally of and parallel to the axis of said work and said pattern spindle.

2. A lathe as recited in claim 1 wherein said carriage means comprises a carriage slidably mounted on a track rigidly connected longitudinally to said frame and a threaded rod extending parallel to said track, and handle means for selectively rotating said rod in either direction for propelling said tool carriage along said track in either direction, said handle means comprising a handle on one end for rotating said rod at one speed for normal rotation and having a handle on the other end connected to said other end through speed reducing means for vernier operation at lower speed.

3. A lathe as recited in claim 2 wherein said carriage has depending portions encircling but not being threaded to said threaded rod, a pair of nuts threaded to said rod and located outwardly of the said depending portions and a sheet metal element having a cut out central portion surrounding said depending portions and having integral end portions which rest on top of said nuts to make them rotate in unison without relative rotation thereof.

* * * * *